(12) United States Patent
Misseri et al.

(10) Patent No.: US 10,575,510 B2
(45) Date of Patent: Mar. 3, 2020

(54) FISHING REEL

(71) Applicants: Shimano Inc., Sakai, Osaka (JP); Shimano Components (Malaysia) SDN. BHD., Pontian, Johor (MY)

(72) Inventors: Muhamad Aidil Bin Misseri, Johor (MY); Mohd Syamsul Johary Bin Ismail, Johor (MY); Ahmad Syafiq Asyraf Ahmad Sabri, Johor (MY); Abu Supian Bin Ahmad, Johor (MY); Keigo Kitajima, Sakai (JP)

(73) Assignees: SHIMANO INC., Sakai, Osaka (JP); SHIMANO COMPONENTS (MALAYSIA) SDN. BHD., Pontian Johor (MY)

( * ) Notice: Subject to any disclaimer, the term of this patent is extended or adjusted under 35 U.S.C. 154(b) by 252 days.

(21) Appl. No.: 15/892,628

(22) Filed: Feb. 9, 2018

(65) Prior Publication Data

US 2018/0343842 A1    Dec. 6, 2018

(30) Foreign Application Priority Data

Jun. 5, 2017   (JP) .................................. 2017-110878

(51) Int. Cl.
 *A01K 89/01* (2006.01)
 *A01K 89/033* (2006.01)
(52) U.S. Cl.
 CPC .......... *A01K 89/046* (2015.05); *A01K 89/059* (2015.05)

(58) Field of Classification Search
 CPC ... A01K 89/046; A01K 89/058; A01K 89/059
 See application file for complete search history.

(56) References Cited

U.S. PATENT DOCUMENTS

| | | | | |
|---|---|---|---|---|
| 3,432,114 A | * | 3/1969 | Meisner ............. | A01K 89/0185 242/256 |
| 4,738,410 A | * | 4/1988 | Yamaguchi ........ | A01K 89/0111 242/271 |
| 4,938,433 A | * | 7/1990 | Toda .................... | A01K 89/029 242/245 |

(Continued)

FOREIGN PATENT DOCUMENTS

| | | |
|---|---|---|
| JP | H09275861 A | 10/1997 |
| JP | 2016220547 A | 12/2016 |

*Primary Examiner* — Emmanuel M Marcelo
(74) *Attorney, Agent, or Firm* — United IP Counselors, LLC

(57) ABSTRACT

A fishing reel includes a regulating member, an operating lever, a first plate and a second plate. The operating lever includes a first through hole penetrated by the regulating member. The first plate includes a second through hole penetrated by the regulating member. The first plate is attached to one of the regulating member and the operating lever so as to be rotatable unitarily therewith. The second plate includes a third through hole penetrated by the regulating member. The second plate is attached to the other of the regulating member and the operating lever so as to be rotatable unitarily therewith. Additionally, the first plate includes a plurality of engaging recesses on a surface thereof opposed to the second plate. Moreover, the second plate includes three or more engaging protrusions, which are engaged with the engaging recesses, on a surface thereof opposed to the first plate.

20 Claims, 7 Drawing Sheets

(56) References Cited

U.S. PATENT DOCUMENTS

| | | | | |
|---|---|---|---|---|
| 6,481,657 | B1* | 11/2002 | Oishi | A01K 89/01557 |
| | | | | 242/289 |
| 2010/0288866 | A1* | 11/2010 | Nakagawa | A01K 89/0155 |
| | | | | 242/289 |
| 2013/0037645 | A1* | 2/2013 | Niitsuma | A01K 89/01555 |
| | | | | 242/288 |
| 2013/0126652 | A1* | 5/2013 | Takechi | A01K 89/015 |
| | | | | 242/283 |
| 2013/0161433 | A1* | 6/2013 | Takechi | A01K 89/059 |
| | | | | 242/243 |
| 2013/0181081 | A1* | 7/2013 | Niitsuma | A01K 89/033 |
| | | | | 242/289 |
| 2013/0306777 | A1* | 11/2013 | Ikebukuro | A01K 89/01555 |
| | | | | 242/288 |
| 2014/0110517 | A1* | 4/2014 | Niitsuma | A01K 89/01555 |
| | | | | 242/288 |
| 2016/0100563 | A1* | 4/2016 | Maruoka | A01K 89/05 |
| | | | | 242/295 |
| 2017/0172131 | A1* | 6/2017 | Toake | A01K 89/045 |
| 2018/0368378 | A1* | 12/2018 | Takechi | A01K 89/046 |

* cited by examiner

FISHING REEL

CROSS-REFERENCE TO RELATED APPLICATIONS

This application claims priority to Japanese Patent Application No. 2017-110878 filed on Jun. 5, 2017, the entirety of which is hereby incorporated by reference in its entirety.

BACKGROUND

Technical Field

The present disclosure relates to a fishing reel.

Background Information

Some types of fishing reels such as dual-bearing reels generally include a casting control mechanism. The casting control mechanism is a mechanism that brakes rotation of a spool shaft by applying a friction force to the spool shaft. By braking the rotation of the spool shaft, the rotational velocity of the spool shaft is suppressed in releasing a fishing line, and occurrence of backlash is prevented.

In a dual-bearing reel described in Japan Laid-open Patent Application Publication No. H09-275861, an operating lever is pivotably attached to a reel unit so as to easily operate a casting control mechanism. A braking force to be applied to a spool shaft can be regulated by pivoting the operating lever in a circumferential direction.

On the other hand, Japan Laid-open Patent Application Publication No. 2016-220547 discloses a configuration regarding a regulating member and an operating lever in FIG. 15. The regulating member is attached to a reel unit so as to regulate a braking force to be applied to a spool shaft, and the operating lever is detachably attached to the regulating member. In this configuration, the operating lever attached to the regulating member is prevented from rotating relatively to the regulating member. Detailedly, the regulating member includes a plurality of recesses on the outer peripheral surface of a flange part thereof, whereas the operating lever includes at least one pin extending from the outer peripheral surface thereof in an axial direction. The at least one pin is engaged with at least one of the plurality of recesses, whereby the operating lever is non-rotatable relatively to the regulating member.

According to the aforementioned configuration, a load is applied to the axially extending pin by pivoting the operating lever. It is concerned that the at least one pin is bent or broken by the load. Hence, an increase in diameter of each pin is required to enhance the strength of each pin. In accordance with this, an increase in diameter of each recess is also required, whereby the recesses cannot be formed at minute circumferential pitches. As a result, it is concerned that the operating lever cannot be attached at an appropriate attachment angle.

BRIEF SUMMARY

It is an object of the present disclosure to provide a fishing reel in which an operating lever can be attached at an appropriate attachment angle.

A fishing reel according to an aspect of the present disclosure includes a reel unit, a spool, a brake mechanism, a regulating member, an operating lever, a first plate and a second plate. The spool is supported by the reel unit, and is wound therebout with a fishing line. The brake mechanism brakes rotation of the spool. The regulating member has a tubular shape. The regulating member is rotatably attached to the reel unit. The regulating member regulates a braking force to be applied by the brake mechanism when rotated to change a distance therefrom relative to the reel unit. The operating lever includes a first through hole penetrated by the regulating member. The operating lever extends in a radial direction. The first plate has an annular shape. The first plate includes a second through hole penetrated by the regulating member. The first plate is attached to one of the regulating member and the operating lever so as to be rotatable unitarily therewith. The second plate has an annular shape. The second plate includes a third through hole penetrated by the regulating member. The second plate is disposed in opposition to the first plate in an axial direction. The second plate is attached to the other of the regulating member and the operating lever so as to be rotatable unitarily therewith. The first plate includes a plurality of engaging recesses on a surface thereof opposed to the second plate. The second plate includes three or more engaging protrusions, which are engaged with the engaging recesses, on a surface thereof opposed to the first plate.

According to the configuration, the first plate and the second plate are engaged with each other, whereby the operating lever is prevented from rotating relatively to the regulating member. Additionally, the plurality of engaging recesses provided on the first plate are provided on a principal surface of the first plate. On the other hand, the three or more engaging protrusions provided on the second plate are provided on a principal surface of the second plate. With this configuration, a stress acting on each engaging protrusion can be reduced lower than that in a well-known configuration. As a result, compared to the well-known configuration, an increase in diameter of each engaging protrusion is not necessary, whereby the engaging protrusions can be aligned at minute pitches. Therefore, the operating lever can be attached at an appropriate attachment angle.

Preferably, the fishing reel further includes a restricting member. The restricting member restricts the first plate and the second plate from moving oppositely to each other. According to the configuration, the first plate and the second plate can be firmly engaged with each other.

Preferably, the restricting member restricts the first plate and the second plate from moving oppositely to each other while being screwed onto the regulating member.

Preferably, the fishing reel further includes a spacer disposed between the restricting member and the operating lever.

Preferably, each of the plurality of engaging recesses is recessed in a hemispherical shape, and each of the three or more engaging protrusions protrudes in a hemispherical shape.

Preferably, the regulating member includes a tubular part and a flange part radially extending from the tubular part.

Preferably, the regulating member further includes an outer wall part extending from an outer peripheral end of the flange part in the axial direction. At least one of the first plate and the second plate is disposed in a space delimited by the tubular part, the flange part and the outer wall part.

Preferably, the first plate is integrated with the one of the regulating member and the operating lever.

Preferably, the second plate is integrated with the other of the regulating member and the operating lever.

Preferably, the fishing reel is a dual-bearing reel. The fishing reel further includes a spool shaft. The spool shaft is configured to be unitarily rotated with the spool. The reel unit includes a first reel body and a second reel body that are disposed at an interval from each other in the axial direction. The spool shaft is supported at one end thereof by the first reel body while supported at the other end thereof by the second reel body. The brake mechanism brakes the rotation of the spool by pressing the one end of the spool shaft.

It should be noted that the fishing reel can be a spinning reel of a rear drag type. In this case, the fishing reel further includes a spool shaft and a friction disc. The spool shaft forwardly extends from the reel unit. The friction disc is engaged with the rear end of the spool shaft so as to be non-rotatable relatively thereto. The spool is supported by the front end of the spool shaft so as to be non-rotatable relatively thereto, and is disposed in front of the reel unit. The brake mechanism brakes the rotation of the spool by pressing the friction disc.

Overall, according to the present disclosure, engaging recesses can be formed at small pitches.

BRIEF DESCRIPTION OF THE DRAWINGS

Referring now to the attached drawings which form a part of this original disclosure.

DETAILED DESCRIPTION OF EMBODIMENTS

A preferred embodiment of a dual-bearing reel according to the present disclosure will be hereinafter explained with reference to the attached drawings. It should be noted that in the following explanation, the term "axial direction" indicates an extending direction of a spool shaft. Additionally, the term "radial direction" indicates a radial direction of an imaginary circle about the spool shaft, whereas the term "circumferential direction" indicates a circumferential direction of the imaginary circle about the spool shaft.

<Dual-Bearing Reel>

Figure 1:
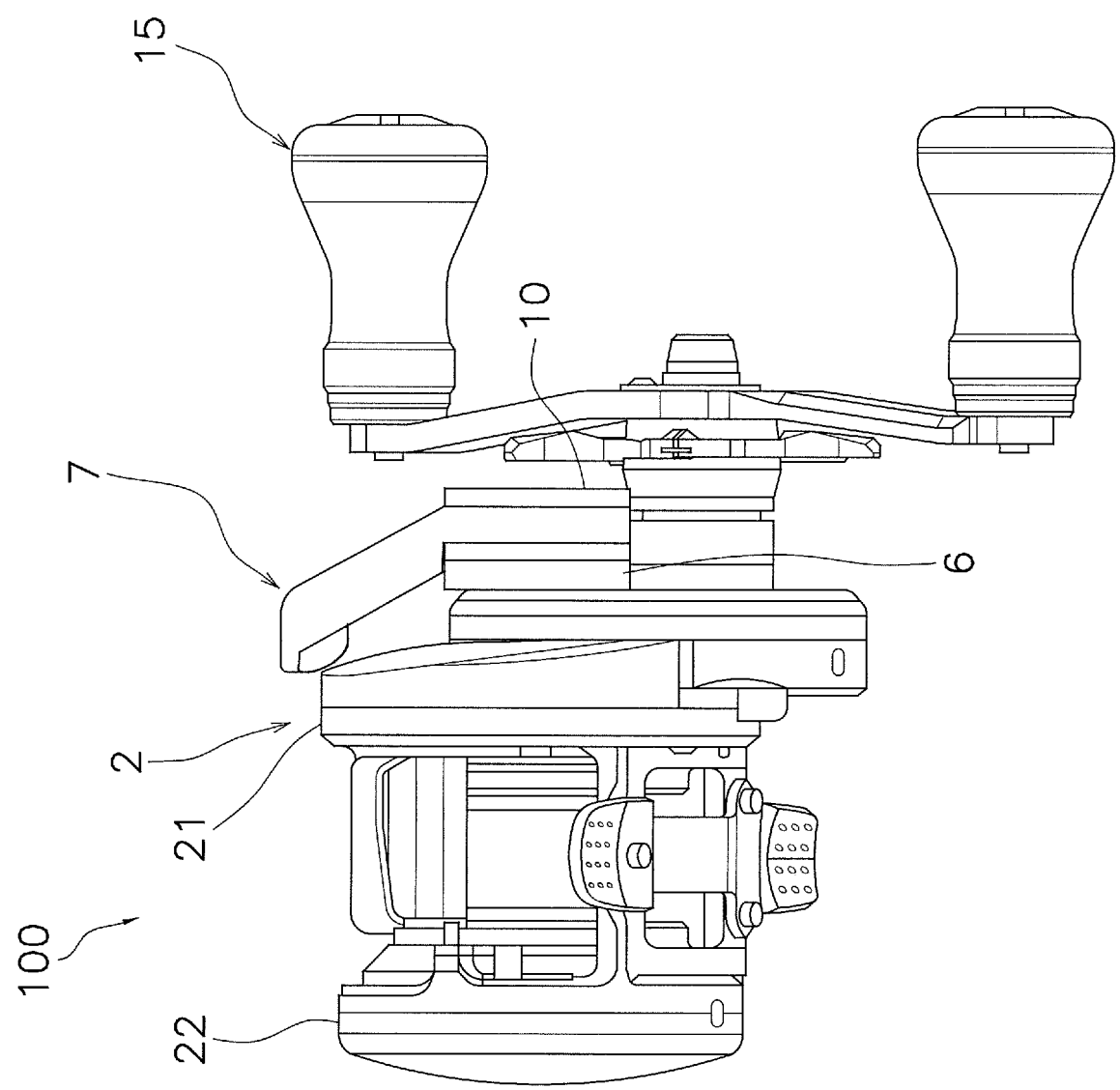
FIG. 1 is a rear view of a dual-bearing reel.
Figure 2:
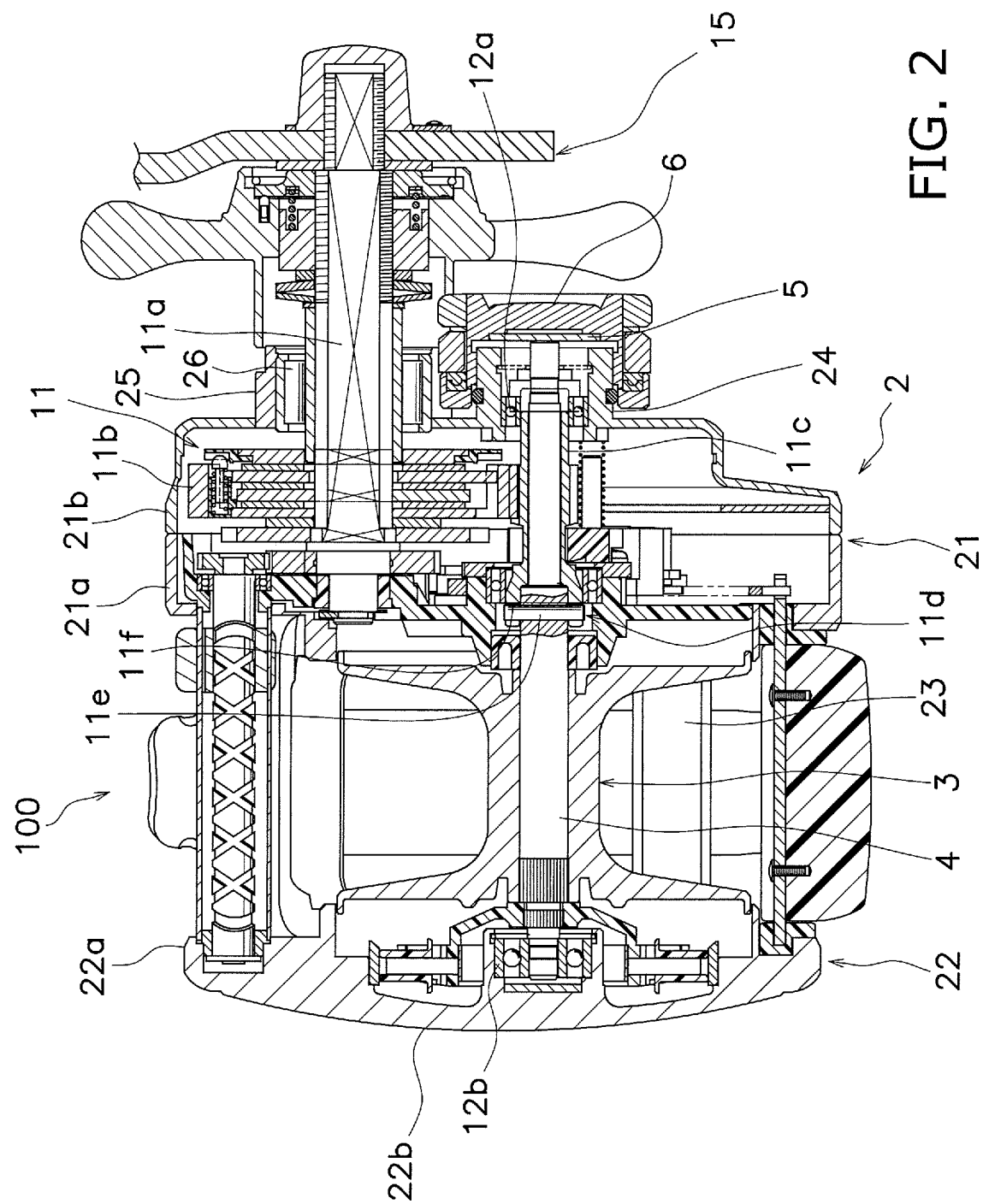
FIG. 2 is a cross-sectional view of the dual-bearing reel.

As shown in FIGS. 1 and 2, a dual-bearing reel 100 includes a reel unit 2, a spool 3, a spool shaft 4, a brake mechanism 5, a regulating member 6, an operating lever 7, a first plate 8, a second plate 9, a restricting member 10 and a handle 15.

<Reel Unit>

The reel unit 2 includes a first reel body 21 and a second reel body 22. The first reel body 21 and the second reel body 22 are disposed at an interval in the axial direction. The first reel body 21 and the second reel body 22 are coupled to each other through a plurality of coupling parts 23.

As shown in FIG. 2, the first reel body 21 includes a first side plate 21a and a first cover 21b. The first reel body 21 includes an accommodation space in the interior thereof. The accommodation space accommodates a rotation transmission mechanism 11 and so forth. The second reel body 22 includes a second side plate 22a and a second cover 22b. The first side plate 21a and the second side plate 22a are coupled to each other through the coupling parts 23. The first side plate 21a, the second side plate 22a and the coupling parts 23 are integrally formed and compose the frame of the reel unit 2.

The first reel body 21 further includes a first boss part 24 and a second boss part 25. The first boss part 24 and the second boss part 25 are disposed at an interval from each other. Each of the first and second boss parts 24 and 25 has a cylindrical shape and protrudes outward in the axial direction. Detailedly, each of the first and second boss parts 24 and 25 protrudes outward from the first cover 21b in the axial direction.

Figure 3:
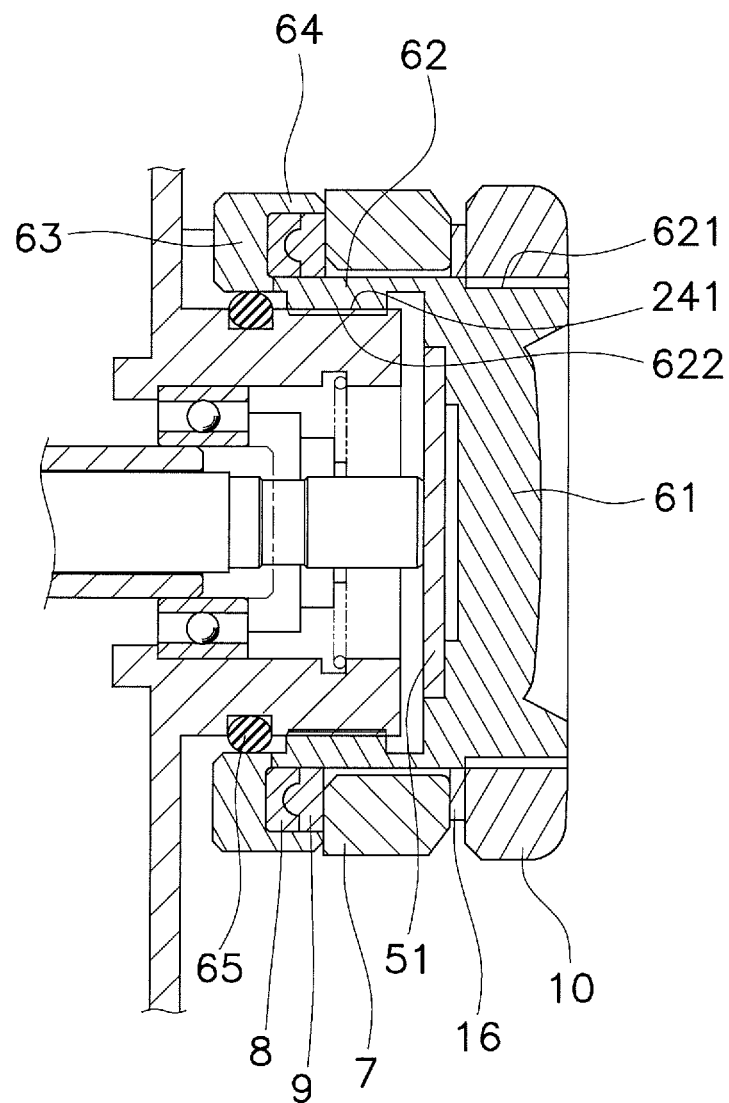
FIG. 3 is an enlarged cross-sectional view of the dual-bearing reel.

The first boss part 24 includes a screw part 241 on the outer peripheral surface thereof (see FIG. 3). The regulating member 6 is attached to the first boss part 24. Detailedly, the regulating member 6 is screwed onto the first boss part 24. The second boss part 25 is disposed at an interval from the first boss part 24. Therefore, the second boss part 25 is disposed at an interval from the regulating member 6 attached to the first boss part 24.

The accommodation space of the first reel body 21 and the outside are communicated through the first and second boss parts 24 and 25. One end of the spool shaft 4 is rotatably supported inside the first boss part 24. On the other hand, a drive shaft 11a is supported inside the second boss part 25 through a one-way clutch 26 so as to be rotatable in a fishing line winding direction.

<Spool>

The spool 3 is disposed between the first reel body 21 and the second reel body 22. Detailedly, the spool 3 has an approximately cylindrical shape and extends in the axial direction. The spool 3 is rotatable with respect to the reel unit 2. The spool 3 is rotatably supported by the reel unit 2 through the spool shaft 4.

<Spool Shaft>

The spool shaft 4 is unitarily rotated with the spool 3. The spool shaft 4 is rotatably supported by the first and second reel bodies 21 and 22. It should be noted that the spool shaft 4 is rotatably supported by the first and second reel bodies 21 and 22 through first and second bearing members 12a and 12b. The spool shaft 4 extends in the axial direction.

<Handle>

The handle 15 is a member for rotating the spool shaft 4, and is rotatably attached to the first reel body 21. When the handle 15 is rotated, the spool shaft 4 is rotated through the rotation transmission mechanism 11.

<Rotation Transmission Mechanism>

The rotation transmission mechanism 11 is a mechanism that transmits the rotation of the handle 15 to the spool shaft 4. The rotation transmission mechanism 11 includes the drive shaft 11a, a drive gear 11b, a pinion gear 11c and a clutch mechanism 11d. The drive shaft 11a is unitarily rotated with the handle 15. The drive gear 11b is unitarily rotated with the drive shaft 11a. The pinion gear 11c is meshed with the drive gear 11b. The pinion gear 11c has a tubular shape, and the spool shaft 4 penetrates the interior of the pinion gear 11c.

The clutch mechanism 11d is configured to allow or block transmitting the rotation of the pinion gear 11c to the spool shaft 4. The clutch mechanism 11d can be set in a clutch-off state and a clutch-on state. The spool 3 is made freely rotatable in the clutch-off state of the clutch mechanism 11d, whereas the spool 3 becomes able to wind the fishing line in the clutch-on state of the clutch mechanism 11d. Specifically, the clutch mechanism 11d is composed of an engaging pin 11e and an engaging recess 11f. The engaging pin 11e penetrates the spool shaft 4 in the radial direction. The engaging recess 11*f* is a recess provided on one end of the pinion gear 11*c*.

When the clutch mechanism 11*d* is set in the clutch-on state, the engaging pin 11*e* is engaged with the engaging recess 11*f*. As a result, the rotation of the pinion gear 11*c* is transmitted to the spool shaft 4, whereby the spool 3 becomes able to wind the fishing line. On the other hand, when the clutch mechanism 11*d* is set in the clutch-off state, the pinion gear 11*c* is moved in a direction separating from the engaging pin 11*e*, whereby the engaging pin 11*e* and the engaging recess 11*f* are disengaged from each other. As a result, the rotation of the pinion gear 11*c* is not transmitted to the spool shaft 4, whereby the spool 3 becomes freely rotatable.

<Brake Mechanism>

The brake mechanism 5 is configured to brake the rotation of the spool shaft 4. The spool shaft 4 is unitarily rotated with the spool 3. Hence, the brake mechanism 5 is capable of braking the rotation of the spool 3 by braking the rotation of the spool shaft 4. Thus, the brake mechanism 5 is an example of a means for braking rotation of the spool 3 by braking the rotation of the spool shaft 4. Detailedly, as shown in FIG. 3, the brake mechanism 5 includes a friction plate 51. The friction plate 51 is attached to the regulating member 6. Detailedly, the friction plate 51 is fixed to the inner surface of a disc part 61 of the regulating member 6. The friction plate 51 makes contact with the spool shaft 4, whereby the rotation of the spool shaft 4 is braked. The friction plate 51 is made of, for instance, carbon cloth.

<Regulating Member>

Figure 4:
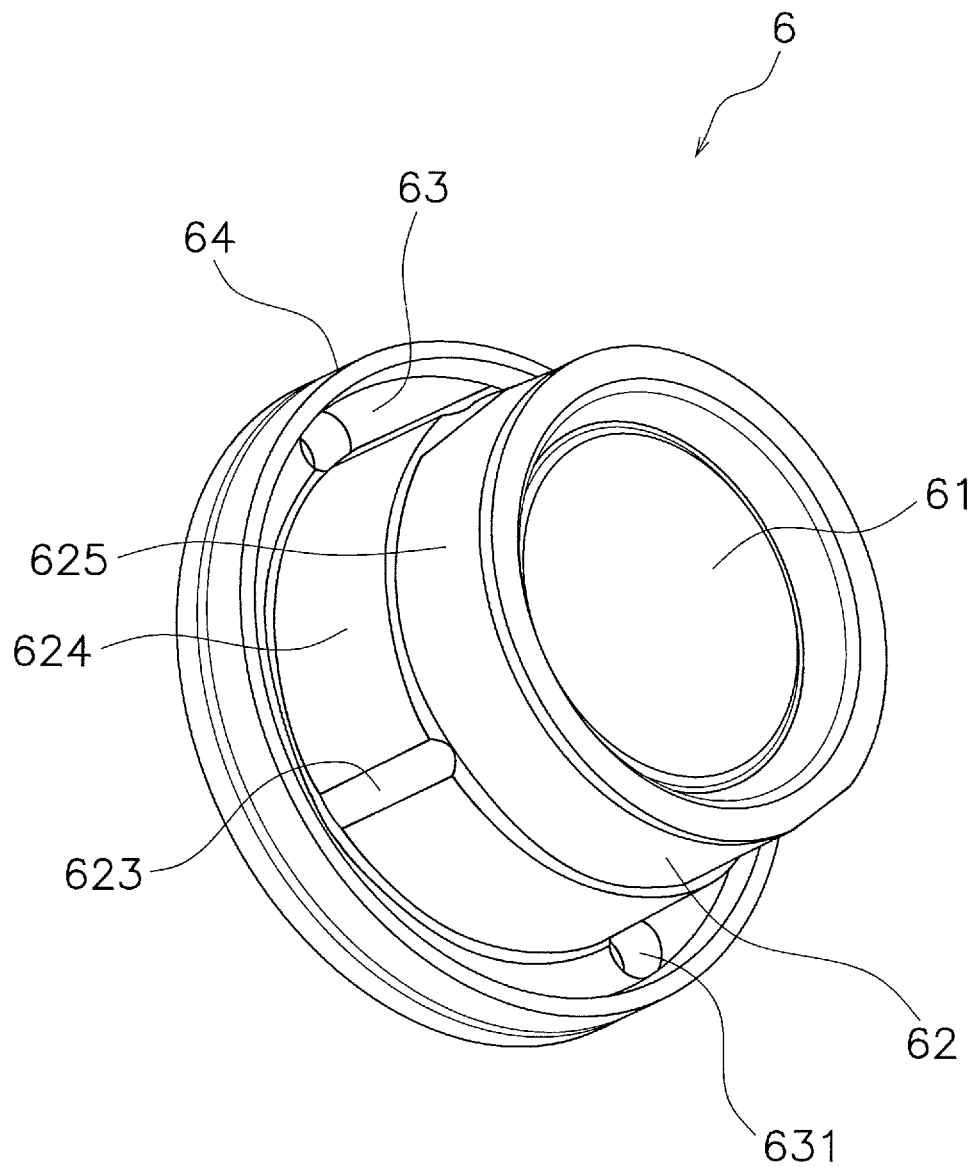
FIG. 4 is a perspective view of a regulating member.

The regulating member 6 is attached to the first boss part 24 of the first reel body 21. As shown in FIGS. 3 and 4, the regulating member 6 has a substantially cylindrical shape and is opened at one of the end surfaces thereof. Detailedly, the regulating member 6 includes the disc part 61, a tubular part 62, a flange part 63 and an outer wall part 64.

The tubular part 62 extends from the outer peripheral end of the disc part 61 in the axial direction. The base end-side end surface of the tubular part 62 is closed by the disc part 61. On the other hand, the distal end-side end surface of the tubular part 62 is opened. The tubular part 62 includes a first screw part 621 on the outer peripheral surface thereof. The first screw part 621 is provided on the base end-side region (the disc part 61—side region) of the tubular part 62. The restricting member 10 is screwed onto the first screw part 621.

Additionally, the tubular part 62 includes a second screw part 622 on the inner peripheral surface thereof. The second screw part 622 is screwed onto the screw part 241 provided on the outer peripheral surface of the first boss part 24. Therefore, when rotated about the axis of the spool shaft 4, the regulating member 6 is moved in the axial direction.

The tubular part 62 includes a plurality of grooves 623 on the outer peripheral surface thereof. The grooves 623 extend in the axial direction. The respective grooves 623 are disposed at intervals from each other in the circumferential direction. Detailedly, the tubular part 62 includes a large diameter part 624 and a small diameter part 625. The large diameter part 624 is disposed on the distal end-side region of the tubular part 62, whereas the small diameter part 625 is disposed on the base end-side region of the tubular part 62. In other words, the distal end-side region of the tubular part 62 has a larger diameter than the base end-side region thereof. Additionally, the respective grooves 623 are provided on the large diameter part 624. On the other hand, the first screw part 621 is provided on the outer peripheral surface of the small diameter part 625.

The flange part 63 radially extends from the tubular part 62. Detailedly, the flange part 63 extends radially outward from the distal end-side region of the tubular part 62. The flange part 63 includes a plurality of attachment holes 631. The respective attachment holes 631 are disposed at intervals from each other in the circumferential direction. It should be noted that the positions of the attachment holes 631 and those of the grooves 623 are matched in the circumferential direction.

The outer wall part 64 extends from the outer peripheral end of the flange part 63 in the axial direction. Specifically, the outer wall part 64 extends from the flange part 63 toward the disc part 61. The outer wall part 64 has a tubular shape and is disposed radially outside the tubular part 62. The axial dimension of the outer wall part 64 is smaller than that of the tubular part 62. The first and second plates 8 and 9 are accommodated in a space delimited by the outer wall part 64, the flange part 63 and the tubular part 62.

The regulating member 6 configured as described above is capable of regulating the braking force for braking the rotation of the spool shaft 4. In other words, the regulating member 6 is capable of regulating the braking force applied by the brake mechanism 5. Specifically, when the regulating member 6 is rotated to be moved in the axial direction, a relative distance between the regulating member 6 and the first reel body 21 is changed in the axial direction, whereby the force of the regulating member 6 pressing the spool shaft 4 through the friction plate 51 can be regulated. Thus, the regulating member 6 is an example of a means for regulating a braking force applied by the brake mechanism 5, and, when rotated, for changing a relative distance between the regulating member 6 and the first reel body 21 of the reel unit 2.

A seal member 65 is disposed between the inner peripheral surface of the regulating member 6 and the outer peripheral surface of the first boss part 24. The seal member 65 can prevent foreign objects from intruding into the interior of the reel unit 2. Additionally, the seal member 65 applies rotational resistance to the regulating member 6 so as to prevent a situation that the regulating member 6 is rotated against the intention of an angler.

<First Plate>

Figure 5:
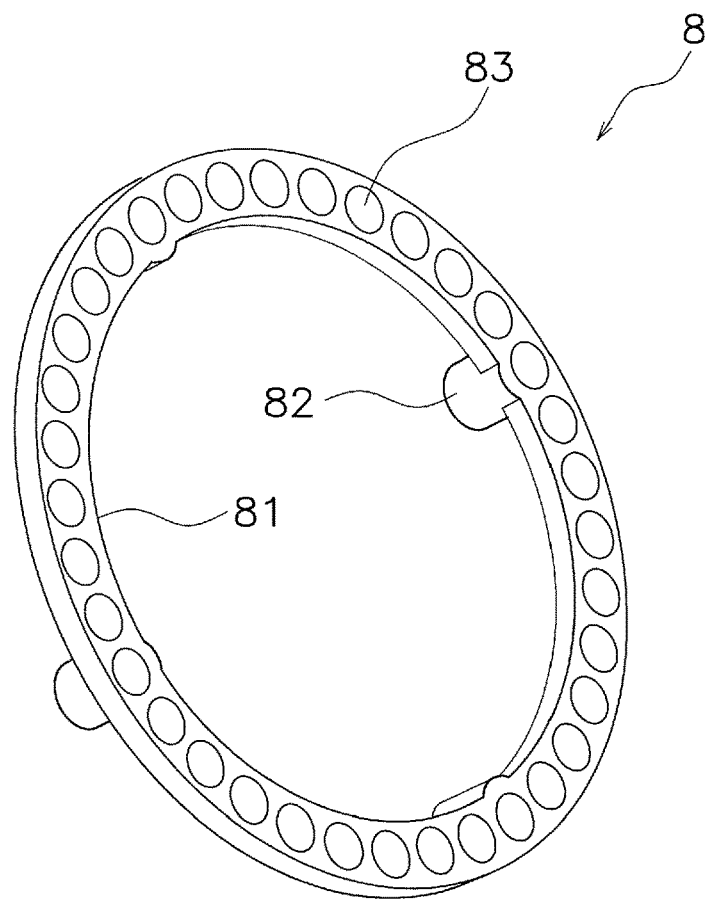
FIG. 5 is a perspective view of a first plate.

As shown in FIG. 5, the first plate 8 is an annular plate including a second through hole 81 in the middle thereof. The regulating member 6 penetrates the interior of the second through hole 81 (see FIG. 3). Detailedly, the large diameter part 624 of the regulating member 6 penetrates the interior of the second through hole 81. In other words, the first plate 8 is attached to the large diameter part 624 of the regulating member 6. The first plate 8 is attached to the regulating member 6 so as to be unitarily rotatable therewith.

Detailedly, the first plate 8 includes a pair of principal surfaces facing axially opposite sides, and a plurality of attachment pins 82 extend from one of the principal surfaces in the axial direction. The principal surface, on which the attachment pins 82 are provided, is opposed to the flange part 63 of the regulating member 6. The respective attachment pins 82 are disposed at intervals from each other in the circumferential direction. The attachment pins 82 are fitted to the attachment holes 631 provided in the flange part 63 of the regulating member 6, respectively. With this configuration, the first plate 8 is unitarily rotated with the regulating member 6. It should be noted that a radially inner part of each attachment pin 82 protrudes into the second through hole 81. The part of each attachment pin 82, protruding into the second through hole 81, is accommodated in each groove 623.

The first plate 8 includes a plurality of engaging recesses 83 on the other of the principal surfaces thereof. The respective engaging recesses 83 are disposed at intervals from each other in the circumferential direction. Preferably, the engaging recesses 83 are disposed at equal intervals in the circumferential direction. Each engaging recess 83 is a hemispherical recess and is recessed from the principal surface in the axial direction. The principal surface, on which the plural engaging recesses 83 are provided, is opposed to the second plate 9.

<Second Plate>

Figure 6:
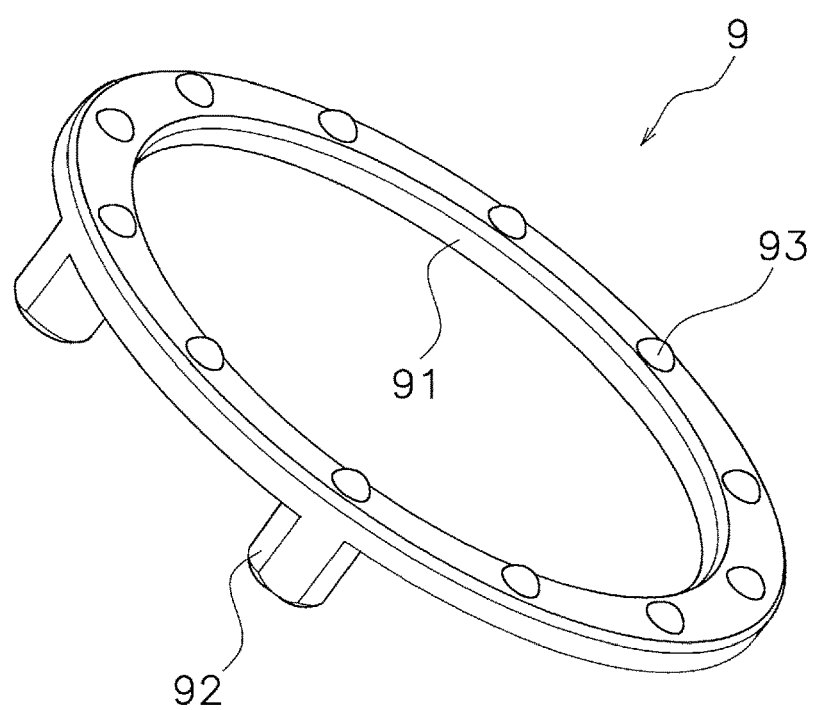
FIG. 6 is a perspective view of a second plate.

As shown in FIG. 6, the second plate 9 is an annular plate including a third through hole 91 in the middle thereof. The regulating member 6 penetrates the interior of the through hole 91 (see FIG. 3). Detailedly, the large diameter part 624 of the regulating member 6 penetrates the interior of the through hole 91. In other words, the second plate 9 is attached to the large diameter part 624 of the regulating member 6. The second plate 9 is disposed in opposition to the first plate 8. The first plate 8 and the second plate 9 are disposed in axial alignment in this order from the flange part 63 side.

The second plate 9 is attached to the operating lever 7 so as to be unitarily rotatable therewith. Detailedly, the second plate 9 includes a pair of principal surfaces facing axially opposite sides. Additionally, the second plate 9 includes a plurality of attachment pins 92 extending from one of the principal surfaces in the axial direction. In the present preferred embodiment, a pair of attachment pins 92 is provided. The principal surface, on which the attachment pins 92 are provided, is opposed to the operating lever 7. The pair of attachment pins 92 is disposed at an interval from each other in the circumferential direction. The attachment pins 92 are fitted to attachment holes 721 (to be described) of the operating lever 7, respectively. With this configuration, the second plate 9 is unitarily rotated with the operating lever 7.

The second plate 9 includes a plurality of (three or more) engaging protrusions 93 on the other of the principal surfaces thereof. The principal surface, on which the engaging protrusions 93 are provided, is opposed to the first plate 8. The engaging protrusions 93 are engaged with the engaging recesses 83 of the first plate 8, respectively. The number of the engaging protrusions 93 is less than or equal to that of the engaging recesses 83. The respective engaging protrusions 93 are disposed at intervals from each other in the circumferential direction. Preferably, the respective engaging protrusions 93 are disposed at equal intervals in the circumferential direction. Each engaging protrusion 93 has a hemispherical shape and protrudes from the principal surface in the axial direction. The shape of each engaging protrusion 93 is fitted along that of each engaging recess 83.

<Operating Lever>

Figure 7:
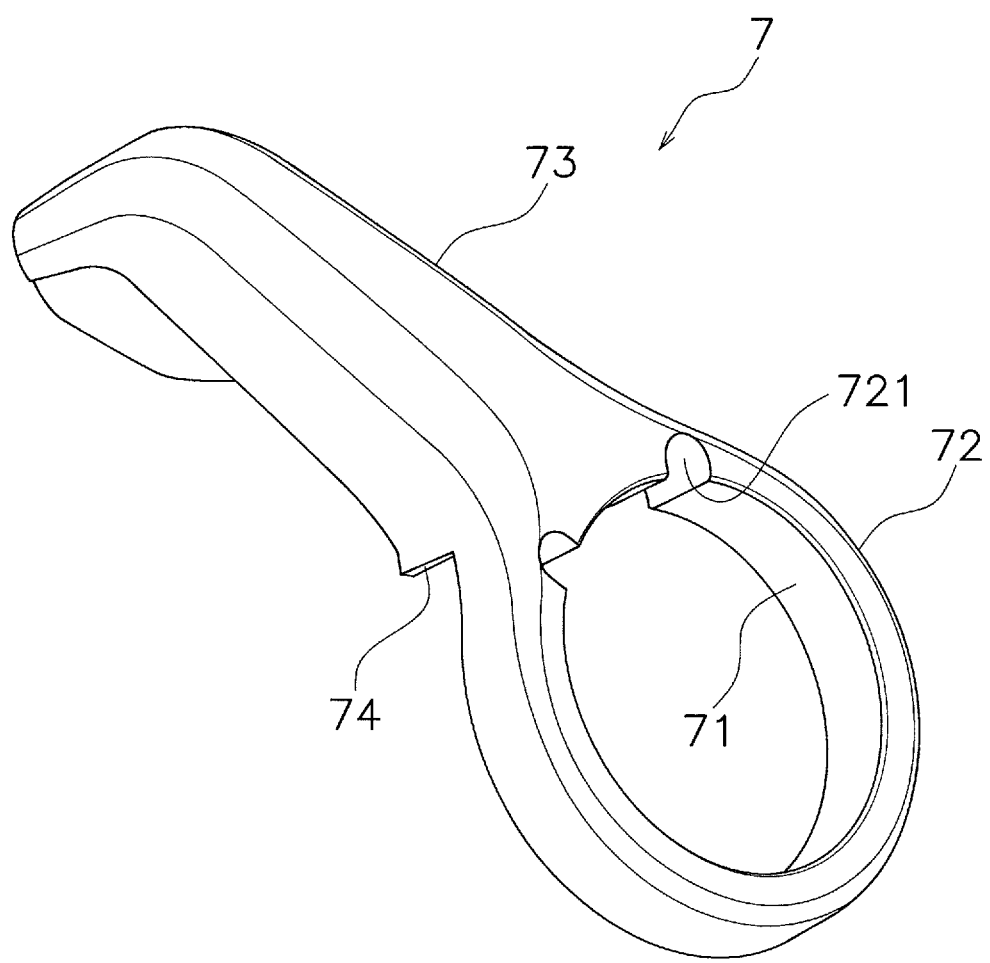
FIG. 7 is a perspective view of an operating lever.

As shown in FIG. 3, the operating lever 7 is detachably attached to the regulating member 6. Detailedly, as shown in FIG. 7, the operating lever 7 includes a first through hole 71. The regulating member 6 penetrates the first through hole 71. Detailedly, the large diameter part 624 of the regulating member 6 penetrates the first through hole 71. In other words, the operating lever 7 is attached to the large diameter part 624 of the regulating member 6. Thus, the operating lever 7, the first plate 8 and the second plate 9 are attached to the large diameter part 624 of the regulating member 6.

The first plate 8, the second plate 9 and the operating lever 7 are disposed in axial alignment in this order from the flange part 63 side.

The operating lever 7 extends from the regulating member 6 in the radial direction. Additionally, the operating lever 7 is disposed to be pivotable in the circumferential direction. It should be noted that the operating lever 7 is unitarily rotated with the regulating member 6.

As shown in FIG. 7, the operating lever 7 includes an attachment part 72 and an operating body 73. The attachment part 72 includes the first through hole 71, and has an annular shape. The outer diameter of the attachment part 72 is larger than the inner diameter of the outer wall part 64 of the regulating member 6. Additionally, the outer diameter of the attachment part 72 is larger than that of the outer wall part 64 of the regulating member 6.

The attachment part 72 is attached to the regulating member 6. Additionally, the attachment part 72 includes the plurality of attachment holes 721. It should be noted that the plurality of attachment holes 721 provided in the present preferred embodiment are a pair of attachment holes 721. The attachment holes 721 extend in the axial direction. The attachment pins 92 of the second plate 9 are fitted to the attachment holes 721, respectively. Part of the lateral surface of each attachment hole 721 is opened to the first through hole 71.

The operating body 73 has a rod shape, and extends from the attachment part 72 in the radial direction. The operating body 73 is integrated with the attachment part 72. The thickness (axial dimension) of the operating body 73 is larger than that of the attachment part 72. Therefore, a step part 74 is provided between the operating body 73 and the attachment part 72. The step part 74 is disposed along the outer peripheral surface of the outer wall part 64 in a condition that the operating lever 7 is attached to the regulating member 6.

<Restricting Member>

As shown in FIG. 3, the restricting member 10 is screwed onto the first screw part 621 of the regulating member 6. In other words, the restricting member 10 is attached to the small diameter part 625 of the regulating member 6. The inner diameter of the restricting member 10 is smaller than the diameter of the first through hole 71 of the operating lever 7.

Figure 8:
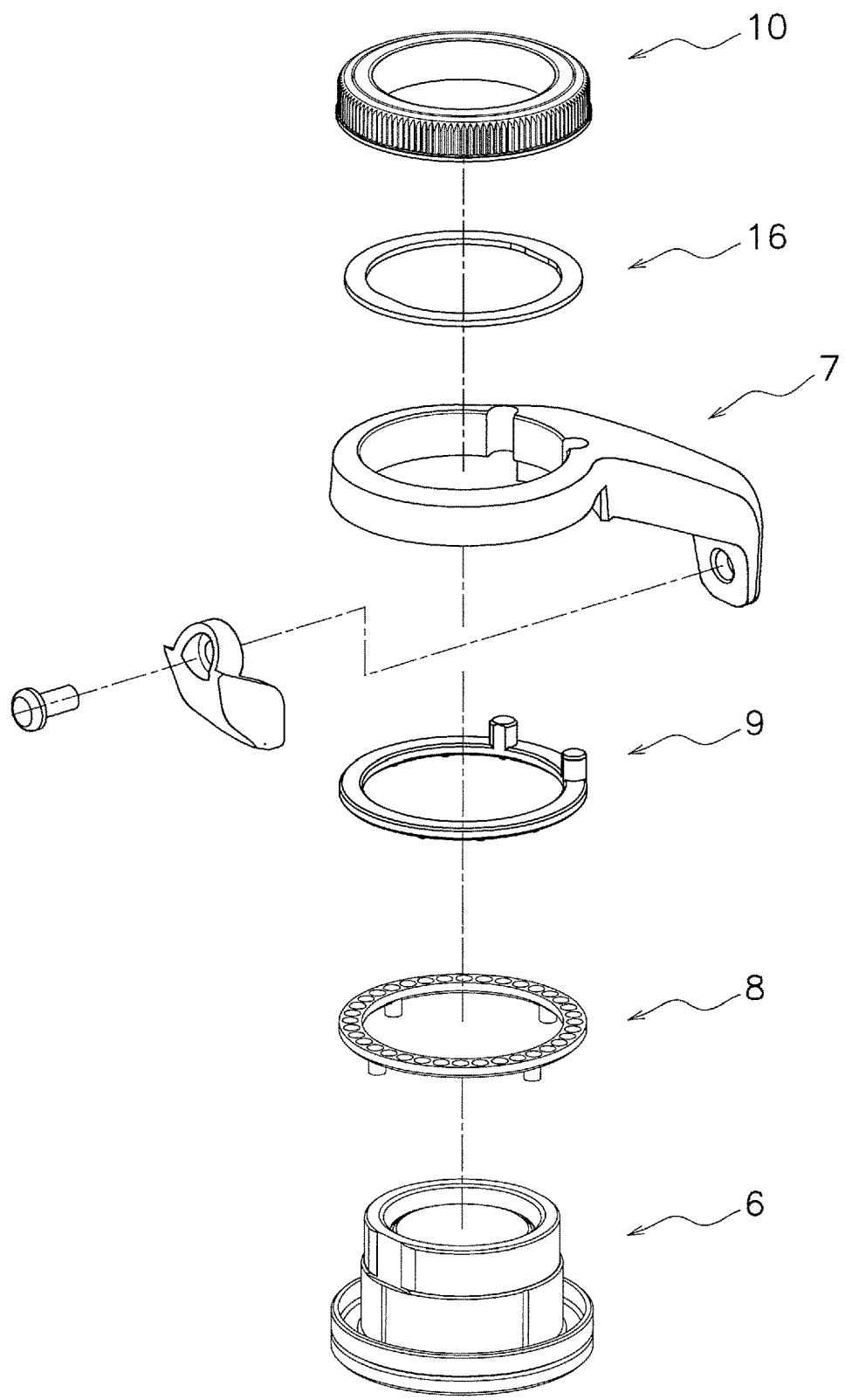
FIG. 8 is an exploded perspective view of a regulating unit.

The restricting member 10 restricts the first plate 8 and the second plate 9 from moving oppositely to each other. Detailedly, the restricting member 10 is a nut. While screwed onto the regulating member 6, the restricting member 10 presses the first plate 8 and the second plate 9 toward the flange part 63 through the operating lever 7. Thus, the restricting member 10 is an example of a means for restricting the first plate 8 and the second plate 9 from moving oppositely to each other while screwed onto the regulating member 6. As a result, the first plate 8, the second plate 9 and the operating lever 7 are locked between the restricting member 10 and the flange part 63 of the regulating member 6. It should be noted that a spacer 16 is disposed between the restricting member 10 and the operating lever 7. In other words, as shown in FIG. 8, the first plate 8, the second plate 9, the operating lever 7, the spacer 16 and the restricting member 10 are attached, in this order, to the regulating member 6. The first plate 8, the second plate 9, the operating lever 7, the spacer 16, the restricting member 10 and the regulating member 6 compose a regulating unit. The respective members composing the regulating unit are unitarily rotated.

‹Action of Dual-bearing Reel›

Next, the action of the dual-bearing reel 100 will be explained. In casting to release the fishing line from the spool 3, the spool shaft 4 is rotated together with the spool 3 in a fishing-line releasing direction. The spool shaft 4 is being pressed by the regulating member 6 through the friction plate 51. In other words, the rotational velocity of the spool shaft 4 and the spool 3 is suppressed by the pressure onto the spool shaft 4, whereby occurrence of backlash is prevented.

When the operating lever 7 is pivoted in the circumferential direction, the regulating member 6 is rotated and moved in the axial direction. Accordingly, the braking force to be applied by the brake mechanism 5 can be regulated. In other words, the braking force to be applied to the spool shaft 4 can be regulated by pivoting the operating lever 7 in the circumferential direction. Thus, the operating lever 7 is an example of a means for regulating the braking force to be applied to the spool shaft 4. It should be noted that the operating lever 7 can be operated by, for instance, a hand of the angler holding the second reel body 22.

In changing the attachment angle of the operating lever 7, the restricting member 10 is firstly rotated and loosened. As a result, the first plate 8 and the second plate 9, both of which are locked by the restricting member 10 and the flange part 63, are released, and become movable oppositely to each other. Accordingly, the first plate 8 and the second plate 9 are disengaged from each other, whereby the operating lever 7 becomes circumferentially rotatable with respect to the regulating member 6. In other words, the attachment angle of the operating lever 7 can be changed. The operating lever 7 is herein set at an appropriate attachment angle. Then, the engaging recesses 83 of the first plate 8 and the engaging protrusions 93 of the second plate 9 are engaged, and the restricting member 10 is rotated and tightened. Consequently, the operating lever 7 can be attached to the regulating member 6 at a desired attachment angle.

One preferred embodiment of the present disclosure has been explained above. However, the present disclosure is not limited to the above, and a variety of changes can be made without departing from the gist of the present disclosure.

Modification 1

In the aforementioned preferred embodiment, the brake mechanism 5 is composed of the friction plate 51. However, the brake mechanism 5 is not particularly limited to this, as long as the brake mechanism 5 is configured to be capable of braking the rotation of the spool shaft 4. For example, the brake mechanism 5 can be composed of the disc part 61 of the regulating member 6. In other words, the friction plate 51 may be omitted. In this case, the disc part 61 also composes part of the brake mechanism 5, and directly brakes the rotation of the spool shaft 4 by making contact with the end surface of the spool shaft 4.

Modification 2

In the aforementioned preferred embodiment, the first plate 8 is attached to the regulating member 6, whereas the second plate 9 is attached to the operating lever 7. However, the configurations of the first and second plates 8 and 9 are not limited to the above. For example, the first plate 8 can be attached to the operating lever 7, whereas the second plate 9 can be attached to the regulating member 6.

Modification 3

In the aforementioned preferred embodiment, the first plate 8 is provided as a member separated from the regulating member 6. However, the first plate 8 can be provided as a single member integrated with the regulating member 6. For example, the regulating member 6 can herein include the aforementioned engaging recesses 83 on the flange part 63.

Modification 4

In the aforementioned preferred embodiment, the second plate 9 is provided as a member separated from the operating lever 7. However, the second plate 9 can be provided as a single member integrated with the operating lever 7. For example, the operating lever 7 can herein include the aforementioned engaging protrusions 93 on the attachment part 72.

Modification 5

In the aforementioned preferred embodiment, the regulating member 6 includes the outer wall part 64. However, the regulating member 6 may not include the outer wall part 64.

Modification 6

In the aforementioned preferred embodiment, the dual-bearing reel 100, to which the present advancement is applied, has been explained. However, the present advancement is also applicable to another type of fishing reel. For example, the present advancement is also applicable to a spinning reel of a rear drag type. In the rear-drag spinning reel, a spool shaft extends forward from a reel unit. A spool is supported by the front end of the spool shaft while being non-rotatable relatively to the spool shaft. The spool is disposed in front of the reel unit. A friction disc is engaged with the rear end of the spool shaft, while being non-rotatable relatively to the spool shaft. Additionally, a brake mechanism brakes the rotation of the spool by pressing the friction disc. In this configuration, a braking force can be regulated by providing the rear-drag spinning reel with a regulating member, a first plate, a second plate and an operating lever similarly to the aforementioned preferred embodiment.

What is claimed is:
1. A fishing reel comprising:
   a reel unit;
   a spool supported by the reel unit, the spool to be wound about with a fishing line;
   a brake mechanism for braking rotation of the spool;
   a regulating member having a tubular shape, the regulating member rotatably attached to the reel unit, the regulating member for regulating a braking force to be applied by the brake mechanism, when rotated, to change a distance from the regulating member relative to the reel unit;
   an operating lever extending in a radial direction, the operating lever including a first through hole penetrated by the regulating member;
   a first plate having an annular shape, the first plate including a second through hole penetrated by the regulating member, the first plate attached to one of the regulating member and the operating lever so as to be rotatable unitarily therewith; and
   a second plate having an annular shape, the second plate including a third through hole penetrated by the regulating member, the second plate disposed in opposition to the first plate in an axial direction, the second plate attached to the other of the regulating member and the operating lever so as to be rotatable unitarily therewith, wherein the first plate includes a plurality of engaging recesses on a surface thereof opposed to the second plate, and the second plate includes three or more engaging protrusions on a surface thereof opposed to the first plate, the three or more engaging protrusions engaged with the engaging recesses.

2. The fishing reel according to claim 1, further comprising:

a restricting member for restricting the first plate and the second plate from moving oppositely to each other.

3. The fishing reel according to claim 2, wherein the restricting member restricts the first plate and the second plate from moving oppositely to each other while screwed onto the regulating member.

4. The fishing reel according to claim 2, further comprising:

a spacer disposed between the restricting member and the operating lever.

5. The fishing reel according to claim 1, wherein each of the plurality of engaging recesses is recessed in a hemispherical shape, and each of the three or more engaging protrusions protrudes in a hemispherical shape.

6. The fishing reel according to claim 1, wherein the regulating member includes a tubular part and a flange part, the flange part radially extending from the tubular part.

7. The fishing reel according to claim 6, wherein the regulating member further includes an outer wall part, the outer wall part extending from an outer peripheral end of the flange part in the axial direction, and at least one of the first plate and the second plate is disposed in a space delimited by the tubular part, the flange part and the outer wall part.

8. The fishing reel according to claim 1, wherein one of the first plate and the second plate is integrated with one of the regulating member and the operating lever.

9. The fishing reel according to claim 8, wherein the other of the first plate and the second plate is integrated with the other of the regulating member and the operating lever.

10. The fishing reel according to claim 1, wherein the fishing reel is a dual-bearing reel, the fishing reel further comprises a spool shaft to be unitarily rotated with the spool, the reel unit includes a first reel body and a second reel body, the first and second reel bodies disposed at an interval from each other in the axial direction, the spool shaft is supported at one end thereof by the first reel body while supported at the other end thereof by the second reel body, and the brake mechanism brakes the rotation of the spool by pressing the one end of the spool shaft.

11. A regulating unit for a fishing reel, the regulating unit comprising:

a regulating member having a tubular shape, the regulating member to be rotatably attached to a reel unit, the regulating member for regulating a braking force to be applied by a brake mechanism, when rotated, to change a distance from the regulating member relative to the reel unit;

an operating lever extending in a radial direction, the operating lever including a first through hole penetrated by the regulating member;

a first plate having an annular shape, the first plate including a second through hole penetrated by the regulating member, the first plate attached to one of the regulating member and the operating lever to be rotatable unitarily therewith; and a second plate having an annular shape, the second plate including a third through hole penetrated by the regulating member, the second plate disposed in opposition to the first plate in an axial direction, the second plate attached to the other of the regulating member and the operating lever so as to be rotatable unitarily therewith, wherein the first plate includes a plurality of engaging recesses on a surface thereof opposed to the second plate, and the second plate includes three or more engaging protrusions on a surface thereof opposed to the first plate, the three or more engaging protrusions engaged with the engaging recesses.

12. The regulating unit according to claim 11, further comprising:

a restricting member for restricting the first plate and the second plate from moving oppositely to each other.

13. The regulating unit according to claim 12, wherein the restricting member restricts the first plate and the second plate from moving oppositely to each other while screwed onto the regulating member.

14. The regulating unit according to claim 12, further comprising:

a spacer disposed between the restricting member and the operating lever.

15. The regulating unit according to claim 11, wherein the regulating member includes a tubular part and a flange part, the flange part radially extending from the tubular part.

16. A fishing reel comprising:

a reel unit;

a spool supported by the reel unit, the spool to be wound about with a fishing line;

means for braking rotation of the spool;

first means for regulating a braking force applied by the means for braking, and, when rotated, for changing a relative distance between the first means for regulating and the reel unit, the first means for regulating rotatably attached to the reel unit;

second means for regulating a braking force to be applied to a spool shaft, the second means for regulating extending in a radial direction, the second means for regulating penetrated by the first means for regulating;

a first plate having an annular shape, the first plate including a second through hole penetrated by the first means for regulating, the first plate attached to one of the first means for regulating and the second means for regulating to be rotatable unitarily therewith; and a second plate having an annular shape, the second plate including a third through hole penetrated by the first means for regulating, the second plate disposed in opposition to the first plate in an axial direction, the second plate attached to the other of the first means for regulating and the second means for regulating to be rotatable unitarily therewith, wherein the first plate includes a plurality of engaging recesses on a surface thereof opposed to the second plate, and the second plate includes three or more engaging protrusions on a surface thereof opposed to the first plate, the three or more engaging protrusions engaged with the engaging recesses.

17. The fishing reel according to claim 16, further comprising:

means for restricting the first plate and the second plate from moving oppositely to each other.

18. The fishing reel according to claim 17, wherein the means for restricting restricts the first plate and the second plate from moving oppositely to each other while screwed onto the first means for regulating.

19. The fishing reel according to claim 17, further comprising:
- a spacer disposed between the means for restricting and the second means for regulating.

20. The fishing reel according to claim 16, wherein the first means for regulating includes a tubular part and a flange part, the flange part radially extending from the tubular part.

* * * * *